United States Patent
Miller (10) Patent No.: US 8,977,719 B1
(45) Date of Patent: Mar. 10, 2015

(54) CONTENT ORIENTED COPYRIGHT DISPLAY

(75) Inventor: Andrew T. Miller, Seattle, WA (US)

(73) Assignee: Google Inc., Mountain View, CA (US)

( * ) Notice: Subject to any disclaimer, the term of this patent is extended or adjusted under 35 U.S.C. 154(b) by 683 days.

(21) Appl. No.: 13/288,205

(22) Filed: Nov. 3, 2011

(51) Int. Cl.
*G06F 15/16* (2006.01)
*G06F 21/10* (2013.01)

(52) U.S. Cl.
CPC ........................... *G06F 21/10* (2013.01)
USPC .......................................................... 709/219

(58) Field of Classification Search
CPC ........................................................ G06F 21/10
USPC .............................................................. 709/219
See application file for complete search history.

(56) References Cited

U.S. PATENT DOCUMENTS

| 2008/0109159 A1* | 5/2008 | Shi et al. ........................ 701/208 |
| 2011/0237279 A1* | 9/2011 | Boudreau et al. .............. 455/457 |
| 2012/0204089 A1* | 8/2012 | Boudreau et al. .............. 715/205 |

OTHER PUBLICATIONS

Bing Maps, Microsoft 2011, www.bing.com/maps, accessed on Nov. 3, 2011.

* cited by examiner

*Primary Examiner* — Arvin Eskandarnia
(74) *Attorney, Agent, or Firm* — Marshall, Gerstein & Borun LLP (57) ABSTRACT

A server supporting mapping applications serves map data to a client device. The map data includes one or more references to copyright information about a feature or image in the map data. The reference may be used to locate the copyright data when the feature is requested and the copyright information is also served to the client device. Alternatively, copyright information can be associated with a tile that includes some or all of the features. When map data contains copyrighted content, a size threshold of the feature or zoom level can be used to determine if the copyright information is to be displayed.

18 Claims, 8 Drawing Sheets

CONTENT ORIENTED COPYRIGHT DISPLAY

FIELD OF TECHNOLOGY

The present disclosure relates to image rendering systems, such as electronic map display systems, and more specifically to downloading and displaying copyright information for content displayed at a client device.

BACKGROUND

Digital maps are found in and may be displayed by a wide variety of devices, including mobile phones, car navigation systems, hand-held GPS units, tablet computers, laptop and desktop computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be complied and stored in the map database before being accessed by map display or map rendering applications and hardware.

Map data may include map image data, such as a satellite image, vector data used to generate map features such as street features at different zoom levels, label data such as text labels of map features, traffic information, transit system status, etc.

Any of the map data may have information subject to copyright or may include content subject to copyright, for example, satellite images, vector map data, photographs of a location, travel guide descriptions, etc., may each have one or more copyrights.

SUMMARY

A computer-implemented method executed on a computer server for associating copyright information with map data for use on a display device includes receiving a request for map data from a client device, selecting, using the computer server, at least a tile of map data for transmission to the client device, responsive to the request for map data. The method further includes associating copyright information with the map data and sending the map data to the client device and sending the copyright information as a separate object in the map data to the client device.

In another embodiment, a client device comprises a processor, a communication network interface coupled to the processor supporting two way communications via a communication network, and a memory coupled to the processor. The embodiment further includes a first routine, stored in the memory, that executes on the processor to send, via the network interface, a request for map data to a map server, a second routine, stored in the memory, that executes on the processor to receive, responsive to the request, vector map data associated with the request for map data, one or more copyright notices, and a lookup table associating a map feature with a particular copyright notice, a third routine, stored in the memory, that executes on the processor to store the vector map data, the one or more copyright notices, and the lookup table, and a fourth routine stored in the memory, that executes on the processor to i) display map features on the display of the client device using the vector map data and ii) identify and display a copyright notice for a map feature displayed on the client device using the lookup table.

In still another embodiment, a method of serving copyright information to a client device includes creating a reference in a map data to copyright information associated with the map data, receiving, at a server device via a network, a request for the map data from a client device and sending, via the network, the map data as a first object. The method further includes sending, via the network, the copyright information associated with the map data as a second object, and sending an executable application to the client device that when the executable application is executed at the client device causes the client device to (i) display the map data, (ii) locate the copyright information using the reference in the map data, and (iii) display the copyright information.

DETAILED DESCRIPTION

Attribution of copyrights, that is, displaying a copyright notice for a particular element of map data, may be done on a per feature or per tile basis and may apply to any element of map data including image data, vector data, or label data. Some feature information may be subject to more than one copyright. Copyright data associated with a feature may be downloaded with other map data as a list of strings and may be persistently stored on the client and may be displayed selectively depending on the visibility of a feature. To accomplish this, the individual elements of map data may include a reference or references to a corresponding copyright string.

Conceptually, a map at the lowest zoom level fits the entire contents of the available map region on a display. For example, a world map at zoom 0 would show the entire Earth using some known projection technique. A conceptual description of this full image is a map tile, or simply, a tile. For the sake of illustration, assume the tile is a square, although other shapes are possible and, in some cases, part of the tile may be outside a viewing window of a particular display.

Zooming in causes, in some embodiments, replacing the initial single tile with four tiles covering the area of the first tile. Zooming in continues through successive zoom levels at a geometric progression with each tile being replaced by four tiles until a fixed limit is reached or a practical minimum for a given application is reached. For example, there is little reason for a street map application to show less than a width of a street.

While map data may be stored in a database or backend system in discrete zoom levels, a map rendering system does not particularly operate on a strict data-per-zoom level basis, particularly a vector-based map system. Because many, if not all, map features may be vector based, that is, described geometrically instead of bitmapped or raster images, discrete zoom levels become less obvious. A particular feature, for example, a road described by its centerline and width may be downloaded at a given zoom level and used over several zoom levels or until the feature moves out of view.

In addition to map image or vector data, additional information such as labels or symbols may be stored in the map database and downloaded to the client device to be displayed with corresponding features to provide labels for the features, additional information about a feature, etc. As above, scalable fonts such as those used in a page description language can also be applied over a range of zoom levels.

A map being displayed may include a copyrighted feature; however, at a given zoom level the feature may not be visible. A determination must be made at what point it is appropriate to display copyright information in that case. When the decision is made at design time, the zoom level at which copyright information should be displayed may be transmitted with either the feature or in the list of copyright information. Similarly, when features include vector information, a map client or map rendering engine may determine that a feature has reached a threshold size where the copyright information should be displayed. In other cases, a feature, such as a restaurant icon, may become visible at a certain zoom level and the display of copyright information is simply tied to the element being displayed or not.

Similarly, a map as displayed may split a copyrighted map element, that is, display only a portion of an image or feature. A determination may be made specifying when enough of a feature, or image, is displayed to require the display of the copyright information.

Figure 1:
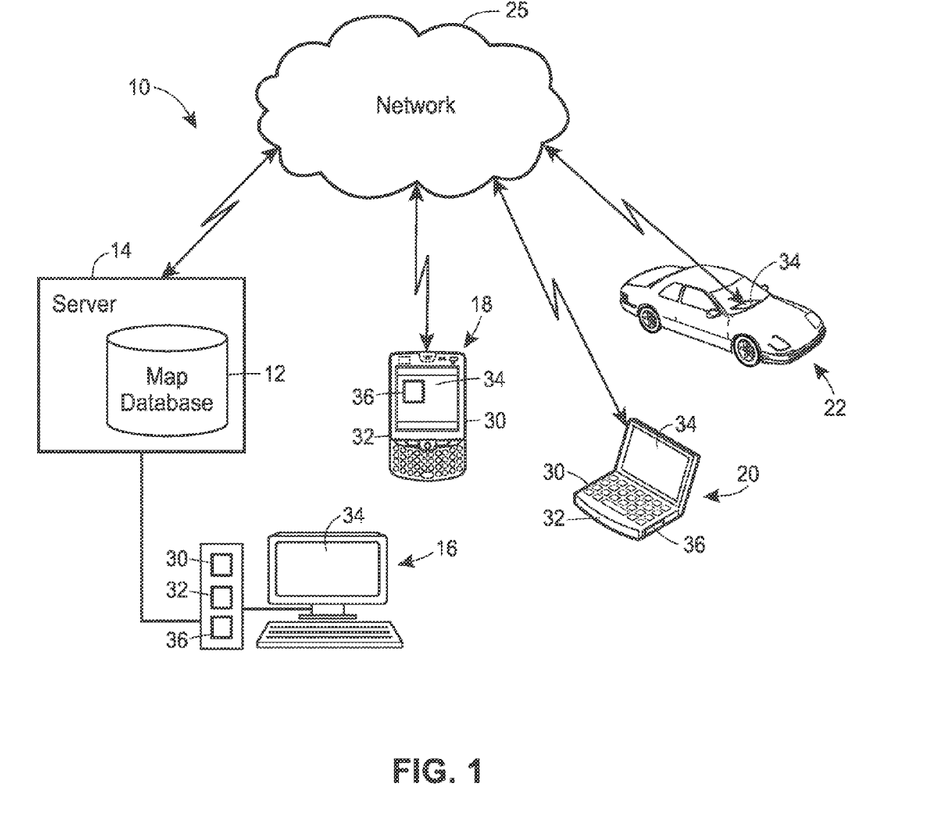
FIG. 1 is a high level block diagram of a map imaging system that implements communications between a map database stored in a server and one or more map image rendering devices.
Figure 2:
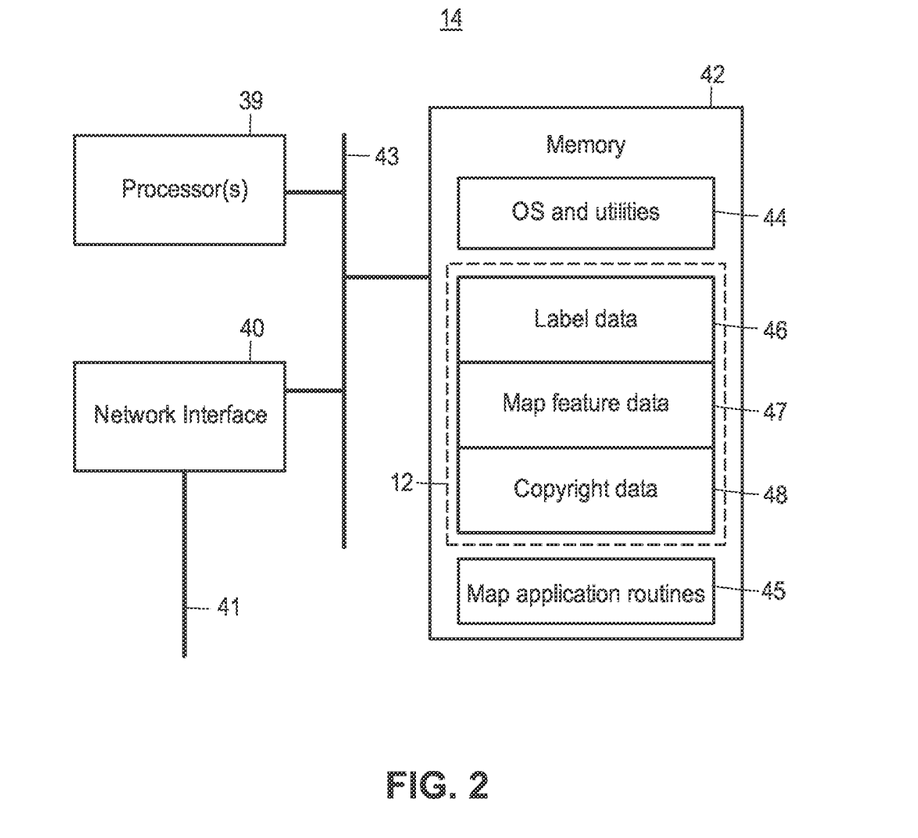
FIG. 2 is a high level block diagram of an image rendering engine used to render map images using map vector data.

FIGS. 1 and 2 provide a basis for discussions of map-related processing.

Referring now to FIG. 1, a map-related imaging system 10 includes a map database 12 stored in a server 14 or in multiple servers located at, for example, a central site or at various spaced apart sites, and also includes multiple map client devices 16, 18, 20, and 22, each of which stores and implements a map client application or a map rendering engine. The map client devices 16-22 may be connected to the server 14 via any hardwired or wireless communication network 25, including, for example, a hardwired or wireless LAN, MAN or WAN, the Internet, or any combination thereof. The map client devices 16-22 may be, for example, mobile phone devices (18), computers such as a laptop, desktop or other types of computers (16, 20) or components of other imaging systems such as components of automobile navigation systems (22), etc. Moreover, the client devices 16-22 may be communicatively connected to the server 14 via any suitable communication system, such as any publically available or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data and vector image map data. The map database may also include labels, points of interest, etc. Some or all of the information in the map database may be copyrighted, requiring the display of copyright attribution. It should be noted that copyright rules are applied differently for different screen sizes. Displays of a certain size (e.g., smaller than 5 inches) may not need to display copyright information with the associated copyrighted information. Instead, a legal notices page may be made available that lists the copyright notices. That notwithstanding, the ability to independently send, store, reference, and display copyright information may be useful for all display sizes and types.

As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally speaking, the map-related imaging system 10 of FIG. 1 operates such that a user, at one of the client devices 16-22, opens or executes a map application (not shown in FIG. 1) that operates to communicate with and to obtain map information or map related data from the map database 12 via the server 14, and that then displays or renders a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc.

Referring now to FIG. 2, an exemplary server 14, such as server 14 of FIG. 1, includes a processor 39, a network interface 40 connecting the server 14 to an external network 41 and a memory 42. The processor 39 may, in practice, include more than one processor or the server 14 itself may be an arrangement of servers, such as interconnected blade servers. The processor 39, network interface 40, and memory 42, as well as other components common to a server and not illustrated, may be connected by one or more data buses 43. A number of processors and databus architectures are known and include those from well known hardware manufacturers such as Intel® and AMD®.

The memory 42 may be a combination of hardware memories, such as, RAM, ROM, solid state disks and/or rotating media and may also include both fixed and removable physical media. The memory may store both data and executable code, including but not limited to an operating system and utilities 44, the map database 12, and one or more map application routines 45. The map database may include label data 46, map feature data 47 in the form of image data, vector data, or both, and copyright data 48 for associated map data elements. The map application routines 45 may include those used to respond to individual client device requests for map data, as further described below.

Figure 3:
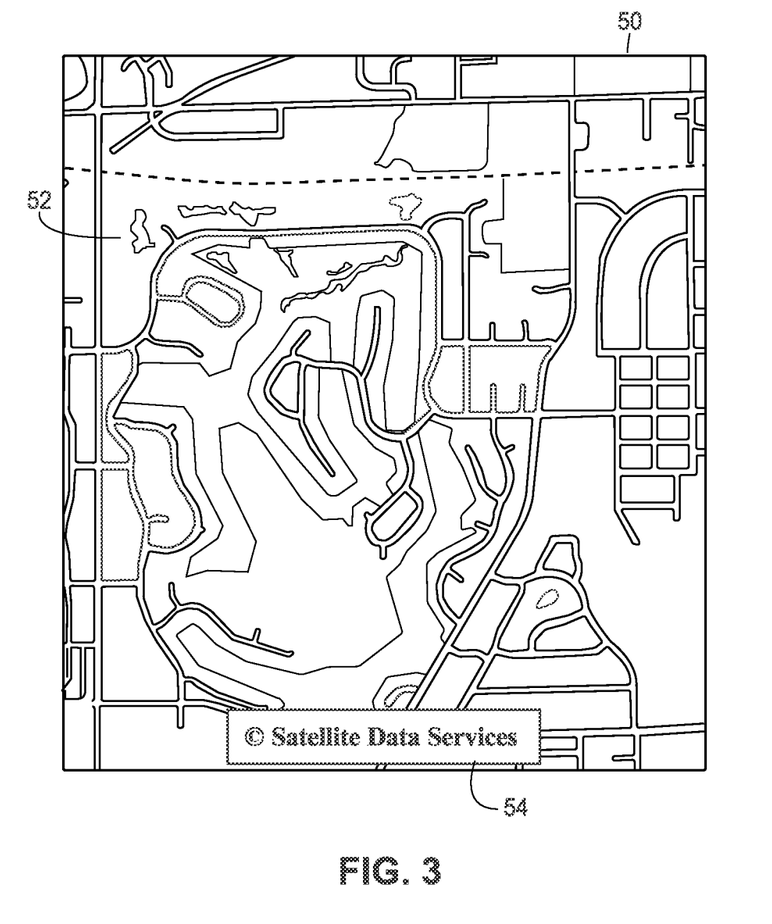
FIG. 3 is a depiction of a computer displayed map.

FIG. 3 is a depiction of a computer displayed map 52 shown within a viewing window 50. The viewing window 50 may be the entire screen of a display of a given computing device, or may be a window within the display. For the purpose of illustration, the map 52 is a satellite image. Shown within the viewing window is a copyright attribution 54. Because the data displayed is only a base satellite image, copyright attribution 54 may be associated with the map tile, rather than any specific feature information. Even though the map used for illustration throughout is an image, the principles discussed apply to other types of maps and map data. What is displayed on the screen may be, for a given zoom level, portions of two of more tiles of map data. There is a circumstance where, even though a map tile may be in the display memory of a computer, no data from that tile may actually be visible in the viewing window 50 of the display. When this occurs, copyright attribution data for the tile not visible need not be displayed, if it is different from a currently displayed tile.

Figure 4:
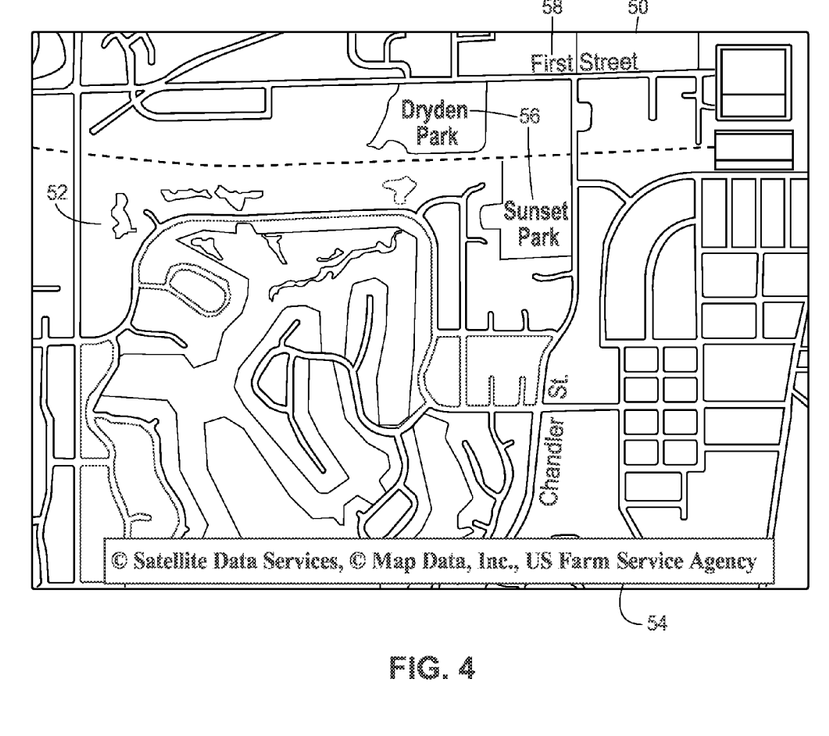
FIG. 4 is a depiction of a higher zoom level of the map of FIG. 3 showing different features.

FIG. 4 is a depiction of a higher zoom level of the map of FIG. 3 showing different features. The satellite image 52 is shown in the viewing window 50. Additional data is illustrated. Labels 56 for two parks are shown, as well as a street label 58. The copyright attribution 54 has additional copyright owners shown, associated with the additional data illustrated. While the copyrighted data shown in FIG. 4 are labels, they are for the purpose of illustration only. Other copyrighted data may be shown at a given zoom level and could include feature information as well, such as street vector data, terrain, landmark, or point of interest data, etc. As described in more detail below with respect to FIGS. 7 and 8, each map tile or other map data may include not only display information such as label text, but also a reference to copyright attribution data. The copyright attribution data may be stored separately from the feature data.

To illustrate further, a user is free to select different types of maps or include different types of overlays. Almost any user command or selection may affect what is displayed on a map, and may, therefore, change the requirements for copyright attribution. For example, a street view may be changed to a traffic map or a terrain map may have a selectable overlay for bike trails. Each of these actions may affect what data is displayed and may require a change in copyright attribution. Because the copyright data is referenced by the other map data, the map engine or map application may be able to dynamically update the copyright information on the display on virtually a click-by-click basis covering both map pan and zoom as well as selection or de-selection of map data.

Additionally, the copyright attribution data may be persistently stored on the computing device for at least the duration of the mapping session, so that simple changes in zoom level do not require re-downloading of the copyright information. In some instances, all copyright information for an initial region containing a map request may be downloaded initially and stored. Subsequent requests for map data may indicate that copyright data is already present, so that the data is not retransmitted in response to map data requests from within that region.

Figure 5:
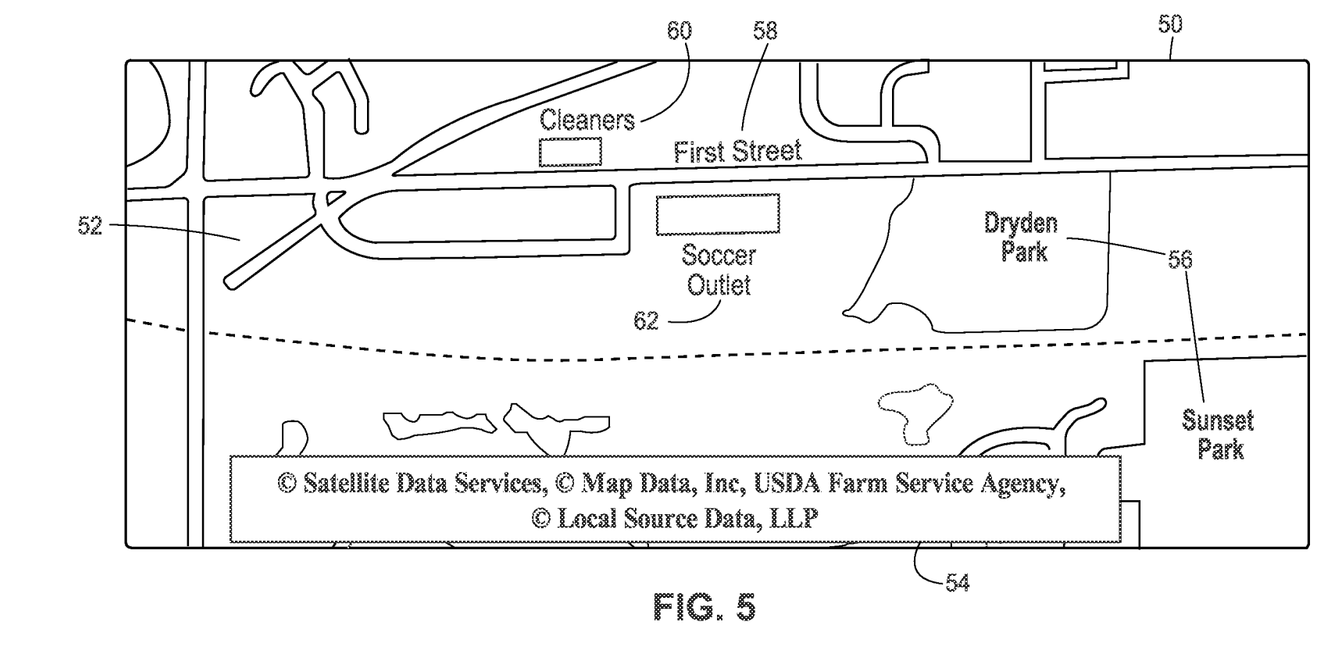
FIG. 5 is a depiction of the map of FIG. 4 at a higher zoom level showing more features.

FIG. 5 is a depiction of the map of FIG. 4 at a higher zoom level showing more features. The satellite image 52 is shown within the viewing window 50. Labels 56 for the two parks are shown, although the label for "Sunset Park" is only partially displayed. Because, as shown, meaningful information may be conveyed even if part of the label is not shown, an algorithm may decide when copyright attribution is appropriate for a partially displayed label. This is discussed more with reference to FIG. 6.

The label 58 for the street information is shown as well as structure and identity information for two businesses, a cleaners 60 and a sporting goods store 62. The copyright attribution 54 acknowledges owners of the additional information displayed.

Figure 6:
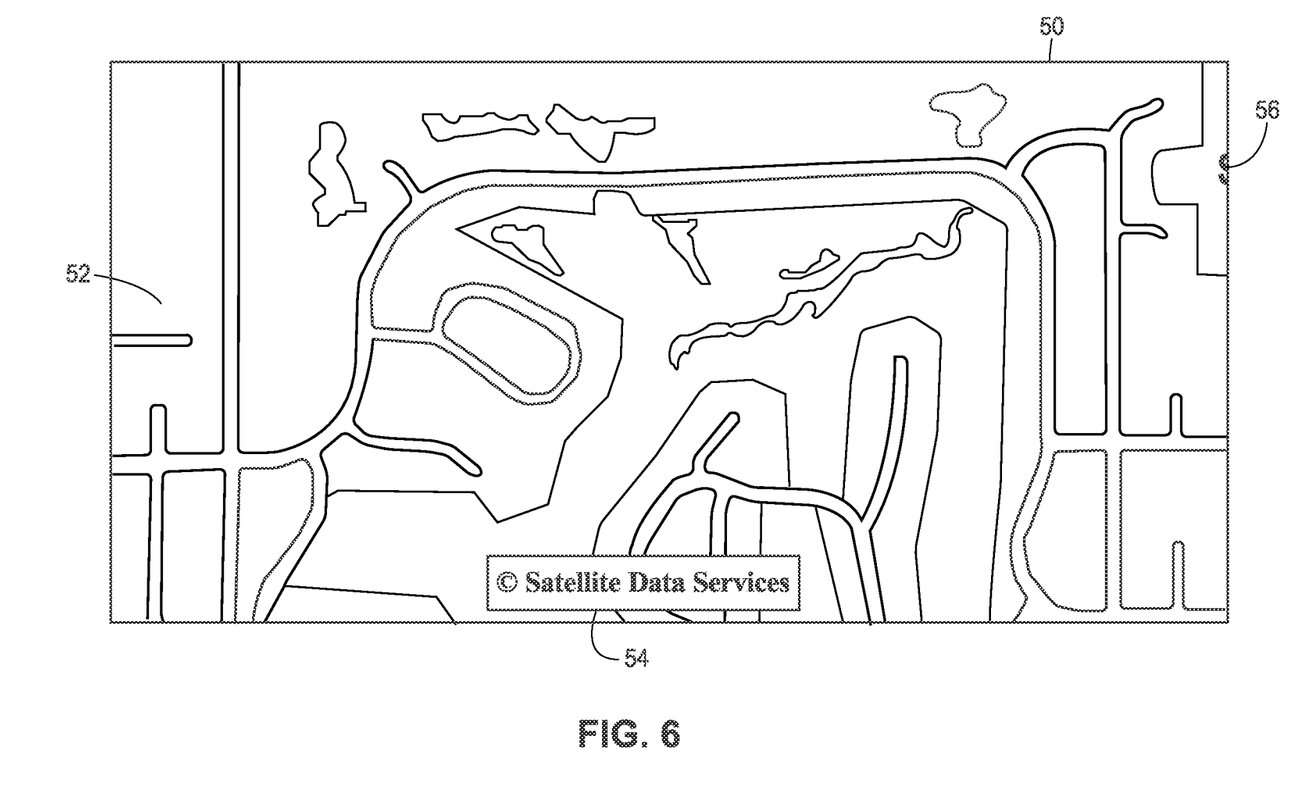
FIG. 6 is a depiction of the map of FIG. 5 at a higher zoom level showing fewer features.

FIG. 6 is a depiction of the map of FIG. 5 at a higher zoom level showing fewer features. As can be seen, the map zoom level has increased from that of FIG. 5 to a point where virtually all of the other features are out of the viewing window 50 other than the satellite image 52. A small portion of the label 56 for "Sunset Park" is shown, but the algorithm discussed above may determine that copyright attribution is not appropriate for the label. Similarly, the algorithm may determine that a some zoom levels, even though a feature is technically present, it may be so small as to not be practically visible. The algorithm may operate on a percentage basis, such as, greater than 5% of a feature must be present for attribution, or may be on a pixel basis, such as a feature must occupy at least 10 contiguous pixels of the display in order to trigger copyright attribution. In other embodiments, display of any portion of a feature at any zoom may trigger display of copyright attributes.

Figure 7:
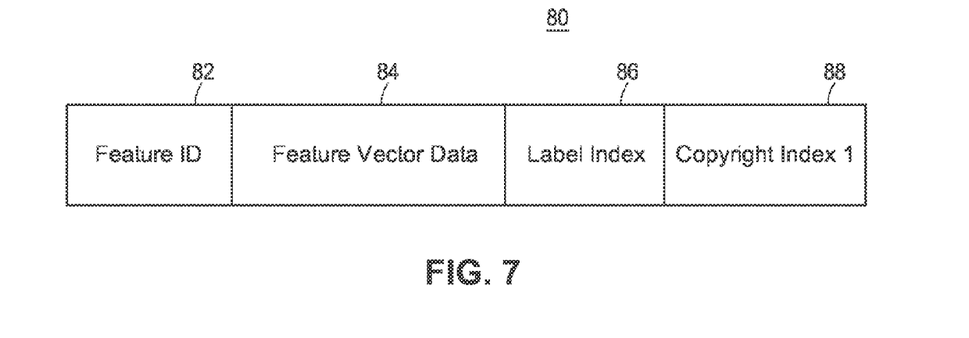
FIG. 7 is a depiction of a feature data record.

FIG. 7 is a depiction of a feature data record 80. The feature data record 80 may be generated and/or stored at the map server 14. The feature data record 80 may include a feature identifier 82, feature data 84 such as feature vector data as illustrated, a label index 86 and a copyright index 88. The label index may be used to relate the map image data associated with the feature data 84 to text displayed with the feature, such as a street image and its street name. The feature data 84 may also include tile-level data, such as a raster or satellite image of an area at a particular zoom level.

In one embodiment, the copyright information may be associated with a feature type. For example, if a map designer knows that all bike trail information is sourced, at least for a given region, by one provider, the display of the copyright data may be tied to all bike trail information, rather than bike trails on a feature-by-feature basis.

The copyright index 88 may be a reference to copyright information associated with the feature data 84. The actual copyright string may appear in the record, but the use of an index may have certain advantages, for example, more than one feature data record 80 can reference a single copyright string The assignment of copyright information may be made at the server-side at the time of map creation. The map designer is responsible for seeing that each source of copyrighted information is correctly associated with the data to be displayed as well as determining when a copyright must be displayed. As discussed above, some features may not require copyright attribution when only a portion of the feature is displayed or when a feature as displayed is below a size threshold. In some cases, these decisions may be made contractually with the provider of the information.

Figure 8:
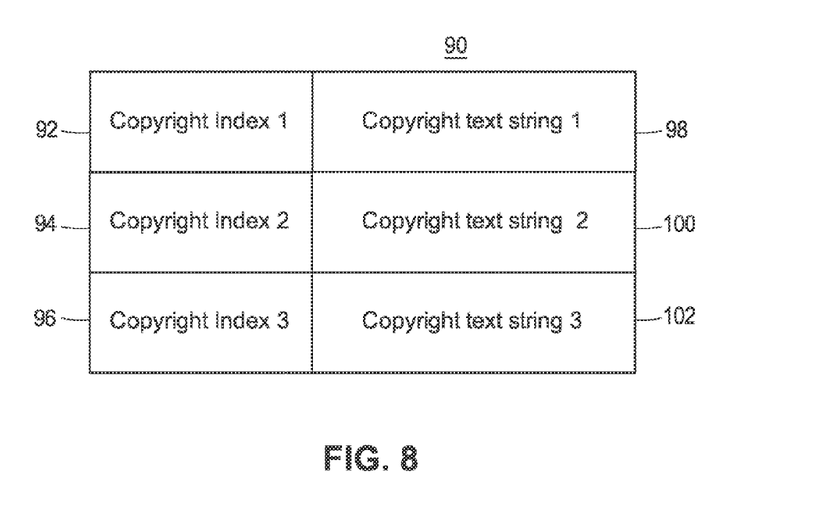
FIG. 8 is a depiction of copyright records.

FIG. 8 is a depiction of a table of copyright records 90. The table 90 may include a number of copyright indices 92, 94, 96. Each of the indices 92, 94, 96 may have an associated copyright text string 98, 100, 102. The table of copyright records 90 may be as small as a single record or may have multiple records, as shown or more. For example, when a region only has satellite information available, the table 90 may only have one record.

However, when map information contains multiple types of data, including streets, buildings, points of interest, traffic, street views, etc., a single map display may have copyrighted information from numerous sources, as illustrated in FIG. 5. When downloading map data to a client device, the map server may read or generate a table of copyright records for the current zoom level or zoom levels covered by the map data. When panning or zooming requires new map data, a new table of copyright records 90 may be downloaded. In an embodiment, the table 90 may be stored on the client device for at least the duration of the mapping session and subsequent requests for map data may include a reference to copyright data on hand so that it need not be re-sent when returning to a previous location or when the same copyright information is appropriate to another area.

An advantage of locally storing copyright attribution data can be seen in the progression of map displays illustrated in FIGS. 3-6, where reference to a locally stored table, similar to table 90, would allow the map client to zoom in and pan through a variety of features and add or remove copyright data without requiring additional round trips to the map server for new copyright information. Further, because the map data, including the vector map data used to draw the images, the copyright information including separate copyright attribution text strings, and the lookup table are all stored locally, the mapping application can function even when there is no data connection to the map server. Because the copyright information may be included in each map tile for all the map features requiring copyright attribution, the mapping application will always have complete information for each map feature in that tile.

In operation in one embodiment, the map client executable is an application received from the server 12 or another application repository (not depicted) such as an app store. The application requests map data and receives from the server 12 a map data object and a second object with copyright information. The executable application displays the map data, uses a reference in the map data to locate copyright information associated with the map data and displays the copyright information.

In another embodiment though, the table of copyright records 90 may cover some or all of the sources of copyright information for that region, even if they are not appropriate for the current zoom level or map data on hand at the client device. The table of copyright records 90, particularly when embodied in text strings is comparatively small when considering other map data. A regional table can be stored over a particular map session or persistently stored over a number of map sessions unless the data becomes obsolete or the memory is needed for copyright information for another region. Methods for determining data obsolescence are known and not discussed further here.

For a given region, the stored table of copyright records 90 may be referenced numerous times as various map features are displayed. In most cases, a particular feature probably has the same copyright obligations as other similar features, so when displaying a map feature, the map client need only determine if a particular copyright attribution for that feature is already displayed. Should a map feature include a reference to copyright information not on hand locally, the map client can request it.

Figure 9:
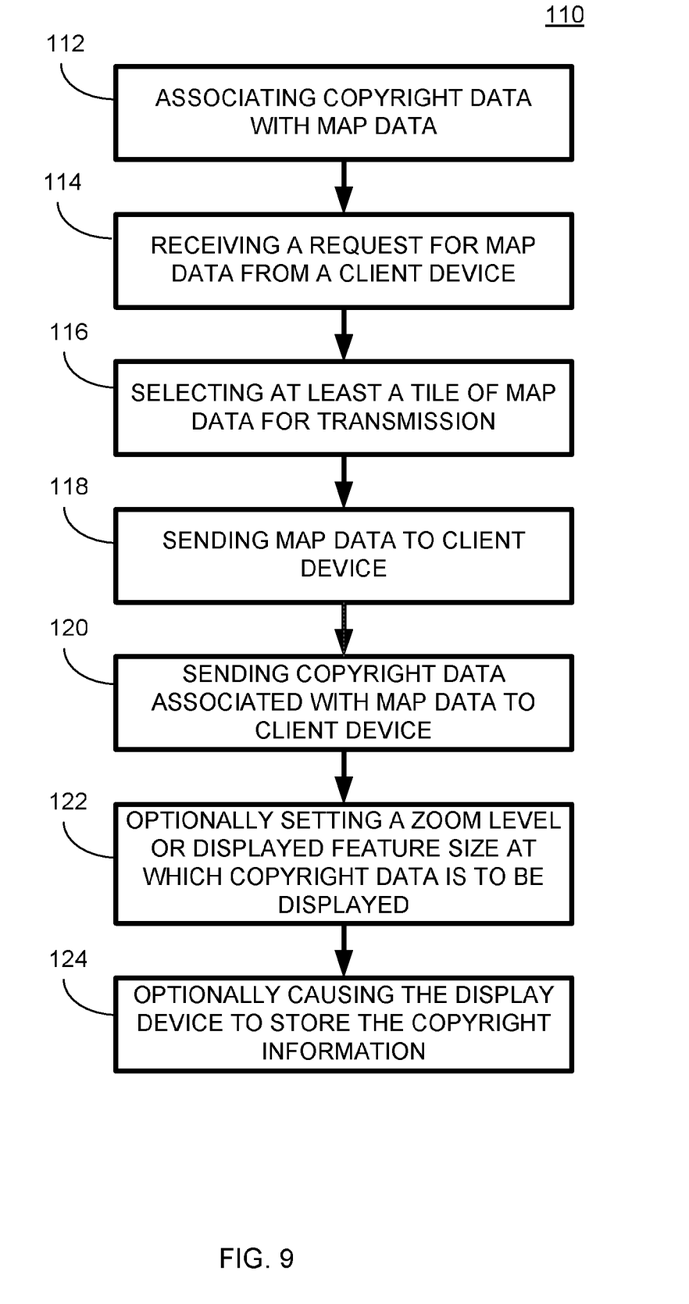
FIG. 9. illustrates a process diagram of an embodiment.

FIG. 9 illustrates a process diagram 110 of an embodiment. A block 112 may associated copyright data with map data. For example, map data may include a reference to a specific record in a table of copyright records 90. Associating the copyright information with the map data may occur at a feature level, for example, for a particular point of interest, or may be associated with an entire map tile, as may be the case for a satellite image. The copyright information associated with the map data may include at least one text string.

A block 114 may receive a request for map data from a client device 16, 18, 20.

A block 116 may select and prepare, as necessary, map data for transmission to the client device 16, 18, 20. Typically, map data is prepared in tiles, or blocks of data for a certain geographic area, covering one or more zoom levels. Some map data is more conducive to supporting multiple zoom levels than others. For example, vector data may cover several zoom levels by simply redrawing the vector data at a different scale. Raster data may become blurred if it is simply redrawn at a higher scale, so in those cases, each zoom level may require new data.

In any case, the map data may be sent to the client device 16, 18, 20 at a block 118.

A block 120 may send copyright data associated with the map data to the client device 16, 18, 20. The copyright data may be sent to the client device 16, 18, 20 in the same transmission as the map data. The copyright information may be sent as a separate object from the map data. This may allow the copyright information to be more easily handled separately at the client device, for example, if the client device will store the copyright information over the length of the mapping session or longer.

Alternatively, sending the copyright information may be responsive to a request from the client device 16, 18, 20 made after the map data is received at the client device 16, 18, 20. For example, this may be the case if the client device is memory or processor limited and it is desirable to have more local control of what data is received and when.

A block 122 may optionally set a zoom level or displayed feature size at which the client device displays the copyright information associated with the individual feature. In another embodiment, the executable code at the client device 16, 18, 20 causes the client device 16, 18, 20 to display the copyright information associated with the individual feature when at least a portion of the feature is visible on a viewing window of the client device. In yet another embodiment executable code at the client device 16, 18, 20 causes the client device to display the copyright information associated with a map tile when at least a portion of the map tile is visible on a viewing window 50 of the client device.

A block 124 may optionally cause the client device 16, 18, 20 to store the copyright data or information in a persistent memory of the client device 16, 18, 20 for a duration of the current mapping session or across several mapping sessions. Persistent storage of the map tile including the associated copyright information may be for an individual mapping session. In another embodiment, the map tile may be saved until the memory is needed or until the data is obsolete.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method executed on a computer server for associating copyright information with map data for use on a display device comprising:
    receiving a request for map data from a client device;
    selecting, using the computer server, at least a tile of vector map data for transmission to the client device, responsive to the request for map data;
    associating copyright information with the tile of vector map data including providing a lookup table having a feature identifier for an individual map feature and a reference to corresponding copyright information;
    sending the tile of vector map data to the client device; and
    sending the copyright information as a separate text object as the tile of vector map data to the client device so that the client device determines whether at least a portion of the individual map feature being displayed on the client device exceeds a threshold size and dynamically updates copyright information displayed on the client device based on the portion of the individual map feature.

2. The computer-implemented method of claim 1, wherein associating copyright information with the tile of vector map data comprises associating copyright information with a feature type of the tile of vector map data.

3. The computer implemented method of claim 1, wherein sending the copyright information is responsive to a request from the client device made after the tile of vector map data is received at the client device.

4. The computer-implemented method of claim 1, further comprising:
    causing the client device to store the copyright data in a persistent memory of the client device.

5. The computer-implemented method of claim 1, wherein the copyright information associated with the map data includes at least one text string.

6. A client device comprising:
    a processor;
    a communication network interface coupled to the processor supporting two way communications via a communication network;
    a memory coupled to the processor;
    a first routine, stored in the memory, that executes on the processor to send, via the network interface, a request for map data to a map server;
    a second routine, stored in the memory, that executes on the processor to receive, responsive to the request, vector map data associated with the request for map data, one or more copyright notices, and a lookup table associating a map feature with a particular copyright notice;
    a third routine, stored in the memory, that executes on the processor to store the vector map data, the one or more copyright notices, and the lookup table; and
    a fourth routine stored in the memory, that executes on the processor to i) display map features on the display of the client device using the vector map data, ii) determine whether a map feature displayed on the client device exceeds a threshold size and iii) identify and display a copyright notice for a map feature displayed on the client device based on whether the map feature exceeds the threshold size using the lookup table so that the one or more copyright notices being displayed on the client device are dynamically updated based on sizes of the map features being displayed.

7. The client device of claim 6, further comprising:
    a fifth routine stored in the memory, that executes on the processor to persistently store the tile of map data on the client device.

8. The client device of claim 6, wherein a copyright notice is stored as a text string.

9. The client device of claim 6, wherein the second routine receives the vector map data and the copyright information in separate transmissions.

10. The client device of claim 6, wherein the vector map data, the one or more copyright notices and the lookup table are received as a tile of map data.

11. A method of providing copyright attribution for information displayed by a map application on a display of a computer device, the method comprising:
    receiving map data at the client device;
    receiving copyright data as an object separate from the map data;
    displaying at least a portion of the map data on the client device;

determining whether each displayed element of the at least a portion of the map data exceeds a threshold size;

retrieving copyright information from the copyright data for each displayed element of the at least a portion of the map data that exceeds the threshold size; and displaying the copyright information so that the copyright information is dynamically updated based on a size of the corresponding element.

12. The computer-implemented method of claim 11, wherein displaying the copyright information comprises displaying the copyright information associated with an individual map feature.

13. The computer-implemented method of claim 12, wherein displaying the copyright information comprises displaying the copyright information associated with the individual map feature only when at least a portion of the individual map feature is visible on a viewing window of the client device.

14. The computer-implemented method of claim 11, wherein displaying the copyright information comprises displaying copyright information associated with a map tile.

15. The computer-implemented method of claim 14, wherein displaying the copyright information associated with the map tile comprises displaying the copyright information associated with the map tile only when at least a portion of the map tile is visible on a viewing window of the client device.

16. The computer-implemented method of claim 11, wherein receiving the copyright data as a separate object from the map data includes receiving the copyright data as a text string in a map tile comprising vector map data.

17. The computer-implemented method of claim 14, wherein receiving map data at the client device comprises receiving map data for two or more map tiles, and further comprising:

when the retrieved copyright information for each displayed element that exceeds the threshold size is the same for each of the two or more map tiles, displaying one instance of the copyright information.

18. The computer implemented method of claim 11, further comprising:

sending a request for the copyright data after receiving the map data and before receiving the copyright data.

* * * * *